(12) United States Patent
Yamamoto

(10) Patent No.: US 9,725,524 B2
(45) Date of Patent: *Aug. 8, 2017

(54) ANTI-VIBRATION RUBBER COMPOSITION AND ANTI-VIBRATION RUBBER

(75) Inventor: Masaaki Yamamoto, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/122,751

(22) PCT Filed: May 31, 2012

(86) PCT No.: PCT/JP2012/064116
§ 371 (c)(1),
(2), (4) Date: Nov. 27, 2013

(87) PCT Pub. No.: WO2012/165561
PCT Pub. Date: Dec. 6, 2012

(65) Prior Publication Data
US 2014/0080979 A1 Mar. 20, 2014

(30) Foreign Application Priority Data

Jun. 1, 2011 (JP) .................... 2011-123049
Jul. 21, 2011 (JP) .................... 2011-159824

(51) Int. Cl.
| C08C 19/20 | (2006.01) |
| C08K 5/3415 | (2006.01) |
| C08K 5/435 | (2006.01) |
| C08F 8/34 | (2006.01) |
| C08J 3/24 | (2006.01) |

(52) U.S. Cl.
CPC ............. *C08C 19/20* (2013.01); *C08F 8/34* (2013.01); *C08K 5/3415* (2013.01); *C08K 5/435* (2013.01); *C08J 3/24* (2013.01); *C08J 2307/00* (2013.01); *C08J 2309/00* (2013.01)

(58) Field of Classification Search
CPC ......... C08C 19/20; C08J 3/24; C08J 2307/00; C08J 2309/00; C08J 2309/02; C08J 2309/06; C08L 7/00; C08L 9/00; C08L 9/02; C08L 9/06; C08K 5/435; C08K 5/3415; C08F 8/34
USPC ...................................................... 525/332.7
See application file for complete search history.

(56) References Cited

U.S. PATENT DOCUMENTS

| 7,053,155 | B2 | 5/2006 | Kimura et al. | |
| 2006/0217493 | A1* | 9/2006 | Kimura | C08K 5/0025 525/331.9 |
| 2007/0144642 | A1* | 6/2007 | Lukich | B60C 1/00 152/209.5 |
| 2010/0119855 | A1* | 5/2010 | Ouhadi et al. | 428/515 |
| 2011/0184109 | A1 | 7/2011 | Satou | |

FOREIGN PATENT DOCUMENTS

| CA | 2010905 A1 | | 8/1990 |
| EP | 0386499 A1 | | 9/1990 |
| EP | 1541627 A1 | | 6/2005 |
| GB | 1369894 | * | 10/1974 |
| JP | 50-4374 A | | 2/1975 |
| JP | 58-160331 A | | 9/1983 |
| JP | 59-227945 A | | 12/1984 |
| JP | 2-248442 A | | 10/1990 |
| JP | 3-258840 A | | 11/1991 |
| JP | H03-258533 A | | 11/1991 |
| JP | 11-302477 | * | 11/1999 |
| JP | 11-302477 A | | 11/1999 |
| JP | 2005-194501 A | | 7/2005 |
| JP | 2006-131871 A | | 5/2006 |
| JP | 2009-203322 A | | 9/2009 |
| JP | 2009242582 A | | 10/2009 |
| JP | 2010-095682 A | | 4/2010 |
| JP | 2010070746 A | | 4/2010 |
| JP | 2010-111742 A | | 5/2010 |
| JP | 2010-254872 A | | 11/2010 |
| WO | WO 2012/049650 A1 | * | 4/2012 |

OTHER PUBLICATIONS

JP 11-302477 machine translation, Nov. 1999.*
https://web.archive.org/web/20110330202428/http://en.wikipedia.org/wiki/Carbon_black; 2011.*
International Search Report for PCT/JP2012/064116 dated Aug. 28, 2012.
Communication from Chinese Patent Office issued Oct. 23, 2014 in counterpart Chinese Patent Application No. 201280026491.6.
Database WPI, Week 201030, Thompson-Scientific, London, GB; AN 2010-E67177, XP002734932, & JP 2010 095682 A (Toyo Rubber Ind Co Ltd) Apr. 30, 2010 (Apr. 30, 2010) *abstract*.
Database WPI, Week 201035, Thompson-Scientific, London, GB; AN 2010-F40617, XP002734933, & JP 2010 111742 A (Toyo Rubber Ind Co Ltd) May 20, 2010 (May 20, 2010) *abstract*.
Database WPI, Week 199201, Thompson Scientific, London, GB; AN 1992-004395, XP002734934, & JP H03 258533 A (Bridgestone Corp) Nov. 18, 1991 (Nov. 18, 1991) *abstract*.
European Patent Office, "Communication and the Extended European Search Report," issued in connection with European Patent Application No. 12792017.1, dated Feb. 10, 2015.
"Manual for Formulating Rubber & Elastomer," Industry and Science Systems Co., Ltd., Mar. 27, 2000, pp. 50-55.
"Dictionary of Rubber Technology," The Society of Rubber Science and Technology, Japan, Sep. 30, 1997, p. 89.

* cited by examiner

*Primary Examiner* — Roberto Rabago
(74) *Attorney, Agent, or Firm* — Sughrue Mion, PLLC

(57) ABSTRACT

The purpose of the present invention is to provide: an anti-vibration rubber composition which enables the production of a hardened rubber article having excellent heat resistance, compression set, low dynamic magnification, tensile properties (elongation, strength), low-temperature properties and workability (scorch resistance); and an anti-vibration rubber which is produced by hardening the rubber composition. The anti-vibration rubber composition is characterized by comprising a rubber component mainly composed of a diene rubber, a bismaleimide compound as a vulcanizing agent, and N-phenyl-N-(trichloromethylthio) benzenesulfoneamide.

14 Claims, No Drawings

ANTI-VIBRATION RUBBER COMPOSITION AND ANTI-VIBRATION RUBBER

CROSS REFERENCE TO RELATED APPLICATIONS

This application is a National Stage of International Application No. PCT/JP2012/064116 filed May 31, 2012, claiming priority based on Japanese Patent Application Nos. 2011-123049 filed Jun. 1, 2011 and 2011-159824 filed Jul. 21, 2011, the contents of all of which are incorporated herein by reference in their entirety.

TECHNICAL FIELD

The present invention relates to an anti-vibration rubber composition which can be advantageously used in high-temperature environments, and to an anti-vibration rubber obtained by curing such a composition. The invention relates in particular to anti-vibration rubber compositions and anti-vibration rubbers which can be advantageously used in parts of an automobile that are exposed to elevated temperatures, such as torsional dampers, engine mounts and muffler hangers.

BACKGROUND ART

To improve passenger comfort in vehicles such as automobiles, efforts have hitherto been made to reduce the incursion of noise and vibrations into the passenger compartment by installing various anti-vibration materials at places where noise and vibrations are generated. For example, by using, for the engine that is the main source of noise and vibrations in an automobile, anti-vibration rubber in components such as torsional dampers, engine mounts and muffler hangers, vibrations while driving the engine are absorbed and both the incursion of noise and vibrations into the passenger compartment and noise dissemination into the surrounding environment are reduced.

The basic properties required of such anti-vibration rubbers are strength properties for supporting a massive body such as an engine, and an anti-vibration performance which absorbs and suppresses vibrations from the body. In addition, when used in a high-temperature environment such as an engine compartment, the anti-vibration rubber, in addition to having, of course, excellent strength properties, a low dynamic-to-static modulus ratio and an excellent anti-vibration performance, is also required to have an excellent heat resistance, ozone resistance and compression set. In recent years, particularly with the trend toward higher engine power and with tighter space constraints in the engine compartment owing to factors such as expansion of the passenger compartment space, temperatures within the engine compartment have been trending upward, creating a more acute need for heat-resistance in automotive anti-vibration rubber.

In addition to the above, because automobiles are used even in high-latitude regions, automotive anti-vibration rubbers are also required to have good low-temperature properties.

Research on compounding specific amounts of a rubber component, a crosslinking system and other additives for anti-vibration rubber in order to impart such collectively outstanding properties is actively underway, and numerous patent applications have already been filed. Of these many patent applications, some make deliberate use of bismaleimide compounds to improve the crosslinking system. For example, JP-A H03-258840 discloses a rubber compound of excellent heat resistance and a low dynamic-to-static modulus ratio that is obtained by compounding sulfur, bismaleimide and a specific carbon black with a rubber component.

In addition, JP-A 2005-194501 discloses a rubber compound having excellent heat resistance, a low dynamic-to-static modulus and excellent durability through the use of a bismaleimide compound and a thiazole-type vulcanization accelerator.

However, although the above rubber compositions have excellent heat resistances and low dynamic-to-static modulus ratios, they leave something to be desired in terms of durability, compression set, low-temperature properties and processability. Also, in order to maintain for an extended period of time the spring characteristics which are strongly desired in anti-vibration rubber, it is necessary to minimize changes in moduli and further enhance the heat resistance.

The inventor earlier disclosed a rubber composition endowed with a low dynamic-to-static modulus ratio and excellent failure characteristics, heat resistance and durability by including, as vulcanizing agents: sulfur, a specific sulfur compound, and a bismaleimide compound (JP-A 2010-254872). However, even in this art, there remains room for improvement in the heat resistance and other properties of the anti-vibration rubber.

PRIOR-ART DOCUMENTS

Patent Documents

Patent Document 1: JP-A H03-258840
Patent Document 2: JP-A 2005-194501
Patent Document 3: JP-A 2010-254872

SUMMARY OF THE INVENTION

Problems to be Solved by the Invention

It is therefore an object of the present invention to provide an anti-vibration rubber composition from which there can be obtained cured rubber articles endowed with an excellent heat resistance and compression set, a low dynamic-to-static modulus ratio, excellent tensile properties (elongation, strength), excellent low-temperature characteristics and excellent processability (scorch resistance). A further object of the invention is to provide an anti-vibration rubber obtained by curing such a rubber composition.

Means for Solving the Problems

The inventor has conducted extensive investigations in order to achieve the above objects, discovering as a result that by using, in combination, a bismaleimide compound and N-phenyl-N-(trichloromethylthio)benzenesulfonamide as vulcanizing agents for a rubber component consisting primarily of a diene rubber, owing to synergistic effects by these vulcanizing agents, the heat resistance, compression set, low dynamic-to-static modulus ratio, tensile properties, low-temperature characteristics and processability of cured rubber articles obtained from the rubber composition can all be improved.

Moreover, in the heat resistance of the anti-vibration rubber of the invention, the above-described rubber compounding, while having the same retention of rubber elongation and strength, enables changes in modulus to be suppressed. The ability to suppress changes in modulus after heat aging enables the spring characteristics strongly desired in anti-vibration rubber to be retained for a long time, making it possible to obtain the riding comfort of a new car for a longer period of time.

Accordingly, this invention provides the following anti-vibration rubber composition and anti-vibration rubber.

[1] An anti-vibration rubber composition comprising: a rubber component composed primarily of diene rubber, a bismaleimide compound as a vulcanizing agent and, an N-phenyl-N-(trichloromethylthio)benzenesulfonamide.
[2] The anti-vibration rubber composition of [1], wherein the rubber component includes a sulfur.
[3] The anti-vibration rubber composition of [2], wherein the sulfur is included in an amount of from 0.2 to 1.0 part by weight per 100 parts by weight of the rubber component.
[4] The anti-vibration rubber composition of [1], [2] or [3], wherein the rubber component includes a thiuram-type vulcanizing accelerator having the subsequently described specific chemical structure.
[5] The anti-vibration rubber composition of any one of [1] to [4], wherein the thiuram-type vulcanization accelerator is included in an amount of from 0.5 to 5.0 parts by weight per 100 parts by weight of the rubber component.
[6] An anti-vibration rubber obtained by curing the rubber composition of any one of [1] to [5].

Advantageous Effects of the Invention

The anti-vibration rubber composition of the invention, while maintaining a good heat resistance, has a compression set, low dynamic-to-static modulus ratio, tensile properties, low-temperature characteristics and processability (scorch resistance) which are all excellent. In addition, in the anti-vibration rubber composition of the invention, because changes in moduli (tensile moduli) after heat aging can be suppressed, it is possible to maintain for a long time the spring characteristics that are strongly desired of anti-vibration rubber, thus enabling the riding comfort of a new car to be maintained for a longer period of time.

EMBODIMENT FOR CARRYING OUT THE INVENTION

The rubber component of the anti-vibration rubber composition of the invention is composed primarily of a diene rubber. Illustrative examples of the diene rubber include, but are not particularly limited to, natural rubber (NR), isoprene rubber (IR), butadiene rubber (BR), styrene-butadiene rubber (SBR) and acrylonitrile-butadiene rubber (NBR). Any one of these may be used alone, or two or more may be used in admixture. In this invention, the use of butadiene rubber (BR) or styrene-butadiene rubber (SBR) is especially preferred.

In the practice of the invention, a bismaleimide compound is used as one of the vulcanizing agents. The bismaleimide compound may be one that is publicly known, and is not particularly limited. However, in this invention, preferred use may be made of a bismaleimide of the following structural formula.

[Chemical Formula 1]

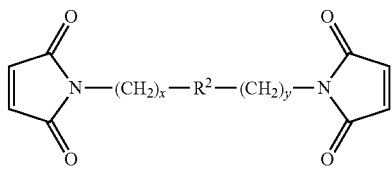

In this formula, x and y are each independently any integer from 0 to 20, and more preferably an integer from 0 to 10. $R^2$ is an aromatic group of 5 to 18 carbons or an alkyl group-containing aromatic group of 7 to 24 carbons. Specific examples include aromatic groups of the structures shown below. Two bond symbols are not shown in the following structures, although divalent groups are formed by two bonds from any two carbon atoms selected within the following structures.

[Chemical Formula 2]

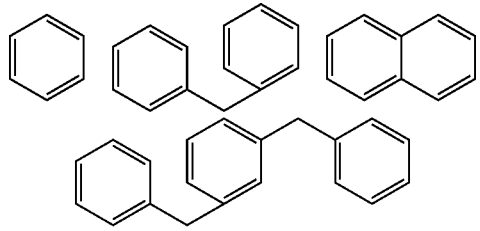

Illustrative examples of bismaleimide compounds of the above structural formulas include N,N'-o-phenylenebismaleimide, N,N'-m-phenylenebismaleimide, N,N'-p-phenylenebismaleimide, 4,4'-methanebis(N-phenylmaleimide), 2,2-bis-[4-(4-maleimidophenoxy)phenyl]propane and bis(3-ethyl-5-methyl-4-maleimidophenyl)methane.

In this invention, preferred use may be made of N,N'-m-phenylenebismaleimide and 4,4'-methanebis(N-phenylmaleimide).

The above bismaleimide compound may be of one type used alone or may be of two or more types used in combination. The amount included is preferably set to from 1.0 to 5.0 parts by weight per 100 parts by weight of the diene rubber. At a bismaleimide compound content below 1.0 part by weight, properties such as the heat resistance and compression set may worsen. On the other hand, at more than 5.0 parts by weight, the tensile properties (elongation, strength), durability and the like may worsen.

The rubber composition of the invention includes N-phenyl-N-(trichloromethylthio)benzenesulfonamide. N-phenyl-N-(trichloromethylthio)benzenesulfonamide has the following chemical structure. In this invention, by including the above substance, it is possible to obtain an anti-vibration rubber which excels in terms of all of the following: heat resistance, compression set, dynamic-to-static modulus ratio, low-temperature properties and processability (scorch resistance). Such improvements were not possible merely by adjusting the relative proportions of sulfur and vulcanization accelerator or the type of vulcanization accelerator as in the prior art.

[Chemical Formula 3]

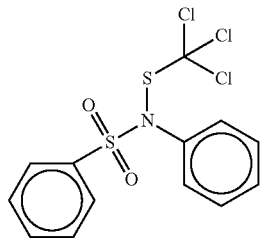

The content of N-phenyl-N-(trichloromethylthio)-benzenesulfonamide per 100 parts by weight of the rubber component is preferably from 0.2 to 4 parts by weight. Outside of this range, improvements in heat resistance, compression set, dynamic-to-static modulus ratio, low-temperature characteristics and processability (scorch resistance) may not be observable.

An example of a specific trade name for N-phenyl-N-(trichloromethylthio)benzenesulfonamide is "Vulkalent E/C" (from Lanxess AG).

A vulcanization accelerator may be used in the rubber composition of the invention. The vulcanization accelerator is exemplified by, but not particularly limited to, benzothiazole-type vulcanization accelerators such as 2-mercaptobenzothiazole, dibenzothiazyl disulfide, N-cyclohexyl-2-benzothiazyl sulfenamide, N-t-butyl-2-benzothiazyl sulfenamide and N-t-butyl-2-benzothiazyl sulfenamide; guanidine-type vulcanization accelerators such as diphenylguanidine; thiuram-type vulcanization accelerators such as tetramethylthiuram disulfide, tetraethylthiuram disulfide, tetrabutylthiuram disulfide, tetradodecylthiuram disulfide, tetraoctylthiuram disulfide, tetrabenzylthiuram disulfide and dipentamethylenethiuram tetrasulfide; dithiocarbamic acid salts such as zinc dimethyldithiocarbamate; and zinc dialkyldithiophosphate.

The above vulcanization accelerators may be of one type, such as a sulfenamide type, a thiuram type, a thiazole type, a guanidine type or a dithiocarbamic acid salt type, or may be a combination of two or more such types. In order to, for example, adjust the vulcanization behavior (rate), it is preferable to use a combination of a thiuram-type and/or a thiazole-type vulcanization accelerator having a relatively high vulcanization accelerating ability with a guanidine-type and/or a sulfenamide-type vulcanization accelerator having a relatively moderate to low vulcanization accelerating ability. Specific examples include the combination of tetramethylthiuram disulfide with N-cyclohexyl-2-benzothiazyl sulfenamide, the combination of tetrabutylthiuram disulfide with N-t-butyl-2-benzothiazyl sulfenamide, and the combination of dibenzothiazyl disulfide with diphenylguanidine. The combination of vulcanization accelerators is not limited to the above combinations. The total amount of vulcanization accelerator included per 100 parts by weight of the rubber component is preferably from 0.2 to 10 parts by weight.

In cases where a thiuram-type vulcanization accelerator is used as the vulcanization accelerator, one having chemical structure (1) or (2) below is preferred.

[Chemical Formula 4]

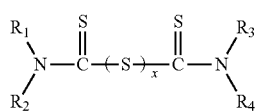

(1)

In the above formula, x is a positive number of at least 2. $R_1$, $R_2$, $R_3$ and $R_4$ are each like or unlike acyclic alkyl groups, illustrative examples of which include methyl, ethyl, n-propyl, isopropyl, n-butyl, isobutyl, sec-butyl, t-butyl, n-pentyl, isopentyl, 2-methylbutyl, 1-methylbutyl, n-hexyl, isohexyl, 3-methylpentyl, 2-methylpentyl, 1-methylpentyl, heptyl, octyl, isooctyl and 2-ethylhexyl.

[Chemical Formula 5]

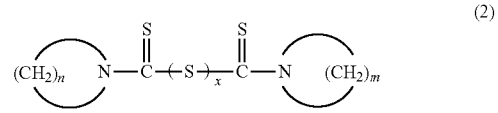

(2)

In the above formula, y is a positive number of 2 or more, and m and n are each positive numbers of 2 or more. A specific example of a thiuram-type vulcanization accelerator of the above formula is dipentamethylenethiuram tetrasulfide (DPTT), in which m and n are each 5.

An example of a thiuram-type vulcanization accelerator of the above chemical structure in which x=1 is tetramethylthiuram monosulfide (e.g., that available under the trade name "Nocceler TS" from Ouchi Shinko Chemical Industry Co., Ltd.).

Illustrative examples of the above thiuram-type vulcanization accelerators include tetramethylthiuram disulfide, tetraethylthiuram disulfide, tetrabutylthiuram disulfide, tetrakis (2-ethylhexyl)thiuram disulfide and dipentamethylenethiuram tetrasulfide. Examples of commercial products include those available under the trade names "Nocceler TT-P", "Nocceler TET-G", "Nocceler TBT", "Nocceler TOT-N" and "Nocceler TRA" (all available from Ouchi Shinko Chemical Industry Co., Ltd.).

The amount of the above thiuram-type vulcanization accelerator included per 100 parts by weight of the rubber component is preferably from 0.5 to 5.0 parts by weight. In excess of this content, the vulcanization rate may become too high, the processability may dramatically worsen, and the tensile properties (elongation, strength) may worsen. On the other hand, below the above content, the degree of vulcanization may become low, and the low-temperature characteristics, tensile properties (elongation, strength), heat aging resistance, compression set and dynamic-to-static modulus ratio may worsen.

Sulfur may or may not be included in the rubber composition of the invention. However, including sulfur enables, in relative terms, even further improvement to be achieved in the properties of the rubber. When sulfur is included, the content of sulfur per 100 parts by weight of the rubber component is preferably from 0.2 to 1.0 part by weight.

In this invention, a vulcanization co-accelerator such as zinc white (ZnO) or a fatty acid may be included to help promote vulcanization. The fatty acid may be a straight-chain or branched fatty acid that is saturated or unsaturated. The number of carbons on the fatty acid is not particularly limited, although a fatty acid of from 1 to 30 carbons, and preferably from 15 to 30 carbons, is advantageous. Specific examples include naphthenic acids such as cyclohexanoic acid (cyclohexanecarboxylic acid) and alkylcyclopentanes having side chains; saturated fatty acids such as hexanoic acid, octanoic acid, decanoic acid (including branched carboxylic acids such as neodecanoic acid), dodecanoic acid, tetradecanoic acid, hexadecanoic acid and octadecanoic acid (stearic acid); unsaturated fatty acids such as methacrylic acid, oleic acid, linoleic acid and linolenic acid; and resin acids such as rosin, tall oil acids and abietic acid. These may be used singly, or two or more may be used in combination. In this invention, preferred use can be made of zinc white and stearic acid. The content of these co-accelerators per 100 parts by weight of the rubber component is preferably from 1 to 10 parts by weight, and more preferably from 2 to 7 parts by weight. A content greater than 10 parts by weight may lead to a poor workability and a poor dynamic-to-static modulus ratio, whereas a content of less than 1 part by weight may retard vulcanization.

A known oil may be used. Examples include, without particular limitation, process oils such as aromatic oils, naphthenic oils and paraffinic oils; vegetable oils such as coconut oil; synthetic oils such as alkylbenzene oils; and castor oil. In this invention, the use of naphthenic oils is preferred. These may be used singly or two or more may be used in combination. The content of these oils per 100 parts by weight of the rubber component, although not particularly limited, may be set to generally from 2 to 80 parts by weight, with the upper limit preferably being not more than 70 parts by weight. At a content outside of the above range, the kneading workability may worsen. When oil-extended rubber is used in the rubber component, the oil included in the rubber should be adjusted such that the combined amount of such oil and any oils that are separately added during mixing falls within the above range.

A known carbon black may be used. Examples include, without particular limitation, carbon blacks such as SRF, GPF, FEF, HAF, ISAF, SAF, FT and MT. In this invention, preferred use may be made of FEF. These carbon blacks may be used singly or two or more may be used in combination. The content of these carbon blacks per 100 parts by weight of the rubber component may be set to generally from 15 to 100 parts by weight, preferably from 20 to 80 parts by weight, and more preferably not more than 60 parts by weight. At a content of more than 100 parts by weight, the workability may worsen. On the other hand, at a content of less than 15 parts by weight, the adhesion may worsen.

A known antioxidant may be used. Examples include, without particular limitation, phenolic antioxidants, imidazole-type antioxidants and amine-type antioxidants. The content of these antioxidants per 100 parts by weight of the rubber component is generally from 2 to 10 parts by weight, and preferably from 3 to 7 parts by weight. A single antioxidant may be used alone or two or more antioxidants may be used in combination.

Where necessary, additives commonly used in the rubber industry, such as waxes, antioxidants, fillers, blowing agents, plasticizers, oils, lubricants, tackifiers, petroleum-based resins, ultraviolet absorbers, dispersants, compatibilizing agents, homogenizing agents and vulcanization retardants, may be suitably included in the rubber component, provided the use of these additives does not detract from the objects of the invention.

The method used to compound the various above ingredients when preparing the rubber composition of the invention is not particularly limited. Kneading may be carried out by compounding all the ingredient starting materials at once, or kneading may be carried out by compounding the respective ingredients in two or three separate stages. Kneading may be carried out using a mixer such as roll mill, an internal mixer or a Banbury rotor. In addition, a known shaping machine such as an extruder or a press may be used when forming the rubber composition into a sheet, strip or the like.

The vulcanization conditions when curing the above rubber composition are not particularly limited, although use can generally be made of a vulcanization temperature of from 140 to 180° C. and a vulcanization time of from 5 to 120 minutes.

The anti-vibration rubber of the invention is obtained by vulcanizing the above-described rubber composition. This anti-vibration rubber is preferably used in those parts of an automobile which are exposed to elevated temperatures, such as torsional dampers, engine mounts or muffler hangers, but is not limited to such uses.

EXAMPLES

The invention is illustrated more fully below by way of Working Examples and Comparative Examples, although the invention is not limited by these Examples.

Example I

Working Examples 1 to 14, Comparative Examples 1 to 10

The compounding formulations shown in Tables 1 to 3 were kneaded, and the anti-vibration rubber compositions of Working Examples 1 to 14 and Comparative Examples 1 to 10 were each vulcanized and cured to given shapes under given conditions, thereby producing shaped materials. The resulting shaped materials were used as specimens for evaluating the anti-vibration rubbers of the invention. These shaped materials were evaluated by carrying measurements of the hardness (Hd), tensile elongation (Eb), tensile strength (Tb), tensile stress (Md100 and Md300), heat resistance, compression set (CS), dynamic-to-static modulus ratio (Kd/Ks), low-temperature properties and Mooney scorching time (processability) in accordance with the following JIS standards. The results are presented in Tables 1 to 3.

[Hardness (Hd)]
Carried out in accordance with JIS K 6253 (type A).
[Tensile Elongation (Eb)]
Carried out in accordance with JIS K 6251.
[Tensile Strength (Tb)]
Carried out in accordance with JIS K 6251.
[Tensile Stress (Md100 and Md300)]
The stress under 100% elongation (Md100) and the stress under 300% elongation (Md300) were determined in accordance with JIS K 6251.
[Heat Resistance (Heat Aging Test)]
This test was carried out under heat aging conditions of 100° C. and 96 hours in accordance with JIS K 6257. The respective test specimens were left to stand under these conditions, following which the above tensile elongation (Eb), tensile strength (Tb) and tensile stress (Md100 and Md300) were each measured. In addition, the percent retention of each of these values was determined. The percent retention is defined as the ratio (%) of a physical value for a test specimen after heat aging with respect to the physical value for the test specimen before heat heating. For example, the percent retention of the tensile elongation (Eb) is expressed as (Eb after heat aging)/(Eb before heating aging)×100. A percent retention approaching 100 (%) means the absence of change with heat aging, which is excellent.
[Compression Set]
A compression set test was carried out in accordance with JIS K 6262 under heating and temperature conditions of 100° C. and 72 hours.
[Static Spring Constant (Ks), Dynamic Spring Constant (Kd), and Dynamic-to-Static Modulus Ratio (Kd/Ks)]
Carried out in accordance with JIS K 6385. The Kd was measured at 100 Hz.
[Low-Temperature Characteristics]
A cylindrical rubber sample having a diameter of 30 mm and a height of 30 mm was fabricated, and the low-temperature characteristics were measured in accordance with JIS K 6385. The Kd value was measured at 40 Hz (this is treated as the initial Kd value). Next, after 10 days of exposure at −35° C. in a constant-temperature tank, the Kd value was similarly measured under the above conditions (this is treated as the Kd value after low-temperature exposure). The ratio (Kd after low-temperature exposure)/(initial Kd) was used as the criterion for rating the low-temperature characteristics. That is, in the respective tables, (Kd after low-temperature exposure)/(initial Kd)≤5 was denoted as "Good"; 5<(Kd after low-temperature exposure)/(initial Kd)≤20 was denoted as "Fair"; and (Kd after low-temperature exposure)/(initial Kd)≥20 was denoted as "NG".

[Curelastometer]

The rubber compositions to be evaluated were vulcanized at 165° C. and measured in accordance with JIS K 6300 (Physical Test Methods for Unvulcanized Rubber). The t(10) values were measured, and indices relative to an arbitrary value of 100 for the t(10) time in Comparative Example 1 are entered in the tables. A larger index represents a better scorching resistance. Here, t(10) signifies the onset of vulcanization, and so this was treated as the scorching time.

Details on the compounding described above are given below.

Rubber Component

Natural rubber (NR): "RSS#4"

Butadiene rubber (BR): "T700" from JSR Corporation

Carbon Black

FEF carbon black was used: "Asahi #65" from Asahi Carbon Co., Ltd.

FT carbon black was used: "Asahi Thermal" from Asahi Carbon Co., Ltd.

Stearic Acid

"Stearic Acid 50S" from New Japan Chemical Co., Ltd.

Zinc White

Available as "No. 3 Zinc White" (Hakusui Tech Co., Ltd.)

Wax

Available under the trade name "Suntight S" (Seiko Chemical Co., Ltd.)

Antioxidant: RD 2,2,4-Trimethyl-1,2-dihydroquinoline polymer, available as "Nocrac 224" from Ouchi Shinko Chemical Industry Co., Ltd.

Antioxidant: 6C

N-Phenyl-N'-(1,3-dimethylbutyl)-p-phenylenediamine, available as "Nocrac NS-6" from Ouchi Shinko Chemical Industry Co., Ltd.

Microcrystalline Wax

Available as "Suntight S" from Seiko Chemical Co., Ltd.

Naphthenic Oil

"Sunthene 4240" from Sun Refining and Marketing Company

Sulfur

Available as "Sulfur Powder" from Tsurumi Chemical

N,N'-m-Phenylenebismaleimide

Available as "Vulnoc PM" from Ouchi Shinko Chemical Industry Co., Ltd.

4,4'-Methanebis(N-phenylmaleimide)

Available as "BMI-RB" from Daiwa Kasei Industry Co., Ltd.

Vulcanization Accelerator TT

Available under the trade name "Accel TMT-PO" (Kawaguchi Chemical Industry Co., Ltd.)

Vulcanization Accelerator CZ

Available under the trade name "Nocceler CZ-G" (Ouchi Shinko Chemical Industry Co., Ltd.)

Vulcanization Accelerator TBT-P Available under the trade name "Accel TBT-P" (Kawaguchi Chemical Industry Co., Ltd.)

Vulcanization Accelerator NS)

Available under the trade name "Nocceler NS" (Ouchi Shinko Chemical Industry Co., Ltd.)

Vulcanization Accelerator TOT

Available under the trade name "Nocceler TOT-N" (Ouchi Shinko Chemical Industry Co., Ltd.)

N-Phenyl-N-(trichloromethylthio)benzenesulfonamide

Available under the trade name "Vulkalent E/C" (Lanxess AG)

TABLE 1

| Rubber formulation (pbw) | Comparative Example | | | | Working Example | | |
|---|---|---|---|---|---|---|---|
| | 1 | 2 | 3 | 4 | 1 | 2 | 3 |
| NR | 100.0 | 100.0 | 100.0 | 100.0 | 100.0 | 100.0 | 100.0 |
| BR | | | | | | | |
| FT CB | 60.0 | | | | | | |
| FEF CB | | 30.0 | 30.0 | 30.0 | 30.0 | 30.0 | 30.0 |
| Stearic acid | 2.0 | 2.0 | 2.0 | 2.0 | 2.0 | 2.0 | 2.0 |
| Zinc white | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 |
| Antioxidant RD | 1.0 | 1.0 | 1.0 | 1.0 | 1.0 | 1.0 | 1.0 |
| Antioxidant 6C | 3.0 | 3.0 | 3.0 | 3.0 | 3.0 | 3.0 | 3.0 |
| Microcrystalline wax | 2.0 | 2.0 | 2.0 | 2.0 | 2.0 | 2.0 | 2.0 |
| Naphthenic oil | 4.0 | 8.0 | 8.0 | 8.0 | 8.0 | 8.0 | 8.0 |
| Sulfur | 1.5 | 1.0 | 0.4 | 0.2 | 1.0 | 0.4 | 0.2 |
| N,N'-m-Phenylenebismaleimide | | | | | | | |
| 4,4'-Methanebis(N-phenylmaleimide) | | 3.0 | 3.0 | 3.0 | 3.0 | 3.0 | 3.0 |
| Vulcanization accelerator TT | | 1.5 | 1.5 | 1.5 | 1.5 | 1.5 | 1.5 |
| Vulcanization accelerator CZ | | 1.5 | 1.5 | 1.5 | 1.5 | 1.5 | 1.5 |
| Vulcanization accelerator TBT | 2.0 | | | | | | |
| Vulcanization accelerator TOT | | | | | | | |
| Vulcanization accelerator NS | 1.0 | | | | | | |
| N-Phenyl-N-(trichloromethyl-sulfenyl)benzene-sulfonamide | | | | | 1.0 | 1.0 | 1.0 |
| Hardness Hd | 52 | 53 | 56 | 52 | 57 | 56 | 53 |
| Tensile elongation Eb (%) | 530 | 520 | 540 | 600 | 530 | 560 | 580 |
| Tensile strength Tb (MPa) | 21.5 | 23.6 | 25.1 | 25.4 | 24.3 | 25.4 | 24.8 |
| Tensile stress Md100 (MPa) | 1.50 | 1.70 | 1.93 | 1.45 | 2.00 | 1.90 | 1.63 |
| Tensile stress Md300 (MPa) | 7.94 | 7.92 | 9.99 | 7.40 | 8.80 | 9.07 | 8.24 |
| Hd after aging | 57 | 55 | 57 | 54 | 58 | 58 | 55 |
| Eb retention after aging (%) | 79 | 83 | 89 | 87 | 91 | 84 | 93 |

TABLE 1-continued

|  | Comparative Example | | | | Working Example | | |
| --- | --- | --- | --- | --- | --- | --- | --- |
| Rubber formulation (pbw) | 1 | 2 | 3 | 4 | 1 | 2 | 3 |
| Tb retention after aging (%) | 87 | 81 | 87 | 89 | 92 | 86 | 94 |
| Md100 retention after aging (%) | 148 | 120 | 120 | 123 | 113 | 113 | 117 |
| Md300 retention after aging (%) | 151 | 122 | 118 | 131 | 113 | 114 | 112 |
| Compression set (%) | 51 | 26 | 26 | 28 | 20 | 20 | 23 |
| Static spring constant Ks (N/mm) | 105.3 | 128.0 | 123.7 | 100.1 | 129.2 | 123.1 | 109.9 |
| Dynamic spring constant Kd100 (N/mm) | 132.8 | 182.2 | 192.9 | 175.4 | 179.0 | 185.7 | 177.3 |
| Dynamic-to-static modulus ratio (Kd100/Ks) | 1.26 | 1.42 | 1.56 | 1.75 | 1.39 | 1.51 | 1.61 |
| Low-temperature characteristics | good | good | NG | NG | good | good | fair |
| Curelastometer (165° C.) T10 (Index) | 100 | 77 | 70 | 75 | 81 | 85 | 87 |

As is apparent from the results in Table 1, Working Example 1, compared with Comparative Example 2, shows improvements in the Md100 retention after aging, Md300 retention after aging, compression set, dynamic-to-static modulus ratio and processing stability (scorching stability). Similarly, Working Example 2, compared with Comparative Example 3, shows improvements in the Md100 retention after aging, Md300 retention after aging, compression set, dynamic-to-static modulus ratio, low-temperature characteristics and processing stability (scorching stability). Likewise, Working Example 3, compared with Comparative Example 4, shows improvements in the Md100 retention after aging, Md300 retention after aging, compression set, dynamic-to-static modulus ratio, low-temperature characteristics and processing stability (scorching stability).

TABLE 2

|  | Comparative Example | | | Working Example | | | Comp. Ex. |
| --- | --- | --- | --- | --- | --- | --- | --- |
| Rubber formulation (pbw) | 5 | 6 | 7 | 4 | 5 | 6 | 8 |
| NR | 100.0 | 100.0 | 100.0 | 100.0 | 100.0 | 100.0 | 100.0 |
| BR |  |  |  |  |  |  |  |
| FT CB |  |  |  |  |  |  |  |
| FEF CB | 30.0 | 30.0 | 30.0 | 30.0 | 30.0 | 30.0 | 30.0 |
| Stearic acid | 2.0 | 2.0 | 2.0 | 2.0 | 2.0 | 2.0 | 2.0 |
| Zinc white | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 |
| Antioxidant RD | 1.0 | 1.0 | 1.0 | 1.0 | 1.0 | 1.0 | 1.0 |
| Antioxidant 6C | 3.0 | 3.0 | 3.0 | 3.0 | 3.0 | 3.0 | 3.0 |
| Microcrystalline wax | 2.0 | 2.0 | 2.0 | 2.0 | 2.0 | 2.0 | 2.0 |
| Naphthenic oil | 8.0 | 8.0 | 8.0 | 8.0 | 8.0 | 8.0 | 8.0 |
| Sulfur | 0.5 | 0.5 | 0.5 | 0.5 | 0.5 | 0.5 | 0.5 |
| N,N'-m-Phenylenebismaleimide |  |  |  |  |  |  |  |
| 4,4'-Methanebis(N-phenylmaleimide) | 5.0 | 2.0 | 1.0 | 5.0 | 2.0 | 1.0 |  |
| Vulcanization accelerator TT | 1.5 | 1.5 | 1.5 | 1.5 | 1.5 | 1.5 | 1.5 |
| Vulcanization accelerator CZ | 1.5 | 1.5 | 1.5 | 1.5 | 1.5 | 1.5 | 1.5 |
| Vulcanization accelerator TBT |  |  |  |  |  |  |  |
| Vulcanization accelerator TOT |  |  |  |  |  |  |  |
| Vulcanization accelerator NS |  |  |  |  |  |  |  |
| N-Phenyl-N-(trichloromethyl-sulfenyl)benzene-sulfonamide |  |  |  | 1.0 | 1.0 | 1.0 | 1.0 |
| Hardness Hd | 57 | 54 | 51 | 57 | 55 | 53 | 50 |
| Tensile elongation Eb (%) | 520 | 560 | 600 | 510 | 540 | 570 | 600 |
| Tensile strength Tb (MPa) | 26.8 | 25.8 | 26.9 | 26.2 | 24.3 | 25.4 | 25.3 |
| Tensile stress Md100 (MPa) | 1.92 | 1.70 | 1.61 | 2.06 | 1.88 | 1.74 | 1.43 |
| Tensile stress Md300 (MPa) | 9.35 | 8.10 | 7.20 | 10.00 | 9.20 | 8.38 | 6.83 |
| Hd after aging | 58 | 57 | 54 | 58 | 58 | 57 | 56 |
| Eb retention after aging (%) | 96 | 91 | 83 | 90 | 91 | 84 | 80 |
| Tb retention after aging (%) | 92 | 89 | 85 | 93 | 95 | 87 | 84 |
| Md100 retention after aging (%) | 133 | 141 | 137 | 126 | 124 | 131 | 140 |
| Md300 retention after aging (%) | 125 | 137 | 139 | 121 | 120 | 126 | 146 |
| Compression set (%) | 23 | 25 | 32 | 20 | 23 | 29 | 33 |
| Static spring constant Ks (N/mm) | 130.0 | 115.0 | 105.2 | 134.0 | 120.0 | 112.2 | 97.8 |
| Dynamic spring constant Kd100 (N/mm) | 223.6 | 192.1 | 180.3 | 223.8 | 192.7 | 181.0 | 171.3 |
| Dynamic-to-static modulus ratio (Kd100/Ks) | 1.72 | 1.67 | 1.71 | 1.67 | 1.61 | 1.61 | 1.75 |
| Low-temperature characteristics | NG | NG | NG | good | good | good | good |
| Curelastometer (165° C.) T10 (Index) | 60 | 70 | 75 | 70 | 80 | 80 | 78 |

As is apparent from the results in Table 2, Working Example 4, compared with Comparative Example 5, shows improvements in the Md100 retention after aging, Md300 retention after aging, compression set, dynamic-to-static modulus ratio, low-temperature characteristics and processing stability, scorching stability. Similarly, Working Example 5, compared with Comparative Example 6, shows improvements in the Md100 retention after aging, Md300 retention after aging, compression set, dynamic-to-static modulus ratio, low-temperature characteristics and processing stability (scorching stability). Likewise, Working Example 6, compared with Comparative Example 7, shows improvements in the Md100 retention after aging, Md300 retention after aging, compression set, dynamic-to-static modulus ratio, low-temperature characteristics and processing stability (scorching stability).

Example II

Working Examples 15 to 26, Comparative Examples 11 to 14

The compounding formulations shown in Tables 4 and 5 were kneaded, and the anti-vibration rubber compositions of Working Examples 15 to 26 and Comparative Examples 11 to 14 were vulcanized and cured to given shapes under given conditions, thereby producing shaped materials. The resulting shaped materials were used as specimens for evaluating the anti-vibration rubbers of the invention. These shaped

TABLE 3

| Rubber formulation (pbw) | Comp. Ex. 9 | Working Example | | | | | | Comp. Ex. 10 | Working Example | |
|---|---|---|---|---|---|---|---|---|---|---|
| | | 7 | 8 | 9 | 10 | 11 | 12 | | 13 | 14 |
| NR | 100.0 | 100.0 | 100.0 | 100.0 | 100.0 | 100.0 | 100.0 | 80.0 | 80.0 | 80.0 |
| BR | | | | | | | | 20.0 | 20.0 | 20.0 |
| FT CB | 50.0 | 50.0 | 50.0 | 50.0 | 50.0 | 50.0 | 50.0 | 50.0 | 50.0 | 50.0 |
| FEF CB | | | | | | | | | | |
| Stearic acid | 2.0 | 2.0 | 2.0 | 2.0 | 2.0 | 2.0 | 2.0 | 2.0 | 2.0 | 2.0 |
| Zinc white | 3.0 | 3.0 | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 | 1.0 | 1.0 |
| Antioxidant RD | 1.0 | 1.0 | 1.0 | 1.0 | 1.0 | 1.0 | 1.0 | 1.0 | 1.0 | 1.0 |
| Antioxidant 6C | 3.0 | 3.0 | 3.0 | 3.0 | 3.0 | 3.0 | 3.0 | 3.0 | 3.0 | 3.0 |
| Microcrystalline wax | 2.0 | 2.0 | 2.0 | 2.0 | 2.0 | 2.0 | 2.0 | 2.0 | 2.0 | 2.0 |
| Naphthenic oil | 5.0 | 5.0 | 5.0 | 5.0 | 5.0 | 5.0 | 5.0 | 5.0 | 5.0 | 5.0 |
| Sulfur | 0.5 | 0.5 | 0.5 | 0.5 | 0.5 | 0.5 | 0.5 | 0.5 | 0.5 | 0.5 |
| N,N',-m-Phenylenebismaleimide 4,4'-Methanebis(N-phenyl-maleimide) | 3.0 | 3.0 | 3.0 | 3.0 | 3.0 | 3.0 | 3.0 | 3.0 | 3.0 | 3.0 |
| Vulcanization accelerator TT | 1.5 | 1.5 | | 1.5 | | 1.5 | 1.5 | 1.5 | 1.5 | 1.5 |
| Vulcanization accelerator CZ | 1.5 | 1.5 | 1.5 | 1.5 | 1.5 | 1.5 | 1.5 | 1.5 | 1.5 | 1.5 |
| Vulcanization accelerator TBT | | | 2.5 | | | | | | | |
| Vulcanization accelerator TOT | | | | | 4.5 | | | | | |
| Vulcanization accelerator NS | | | | | | | | | | |
| N-Phenyl-N-(trichloromethyl-sulfenyl)-benzenesulfonamide | | 0.2 | 1.0 | 1.0 | 1.0 | 2.0 | 4.0 | | 1.0 | 2.0 |
| Hardness Hd | 53 | 54 | 54 | 54 | 55 | 54 | 55 | 55 | 57 | 58 |
| Tensile elongation Eb (%) | 550 | 530 | 520 | 520 | 560 | 480 | 490 | 590 | 570 | 550 |
| Tensile strength Tb (MPa) | 23.2 | 22.7 | 23.5 | 22.5 | 23.5 | 20.4 | 21.2 | 18.4 | 18.6 | 17.9 |
| Tensile stress Md100 (MPa) | 1.50 | 1.58 | 1.70 | 1.69 | 1.94 | 1.71 | 1.86 | 1.64 | 1.95 | 1.95 |
| Tensile stress Md300 (MPa) | 7.76 | 8.15 | 9.47 | 8.68 | 8.90 | 9.18 | 9.48 | 6.00 | 6.74 | 6.77 |
| Hd after aging | 54 | 55 | 56 | 56 | 58 | 56 | 58 | 57 | 58 | 59 |
| Eb retention after aging (%) | 87 | 91 | 89 | 88 | 85 | 90 | 88 | 90 | 91 | 92 |
| Tb retention after aging (%) | 91 | 95 | 90 | 91 | 85 | 101 | 91 | 90 | 90 | 91 |
| Md100 retention after aging (%) | 123 | 115 | 120 | 116 | 123 | 119 | 118 | 117 | 114 | 115 |
| Md300 retention after aging (%) | 126 | 119 | 124 | 115 | 125 | 124 | 121 | 123 | 120 | 118 |
| Compression set (%) | 23 | 22 | 21 | 20 | 17 | 20 | 22 | 23 | 22 | 21 |
| Static spring constant Ks (N/mm) | 109.2 | 109.0 | 117.0 | 115.4 | 120.1 | 116.3 | 118.2 | 118.3 | 124.8 | 126.2 |
| Dynamic spring constant Kd100 (N/mm) | 141.0 | 137.2 | 143.1 | 142.1 | 143.0 | 144.2 | 147.1 | 152.9 | 158.3 | 156.3 |
| Dynamic-to-static modulus ratio (Kd100/Ks) | 1.29 | 1.26 | 1.22 | 1.23 | 1.19 | 1.24 | 1.24 | 1.29 | 1.27 | 1.24 |
| Low-temperature characteristics | NG | good | good | good | good | good | good | fair | good | good |
| Curelastometer (165° C.) T10 (Index) | 75 | 77 | 108 | 85 | 111 | 96 | 100 | 85 | 95 | 100 |

As is apparent from the results in Table 3, Working Examples 7 to 12, compared with Comparative Example 9, show improvements in the Md100 retention after aging, Md300 retention after aging, compression set, dynamic-to-static modulus ratio, low-temperature characteristics and processing stability (scorching stability). Also, Working Examples 13 and 14, compared with Comparative Example 10, show improvements in the Md100 retention after aging, Md300 retention after aging, compression set, dynamic-to-static modulus ratio, low-temperature characteristics and processing stability (scorching stability).

materials were evaluated by carrying measurements of the hardness (Hd), tensile elongation (Eb), tensile strength (Tb), heat aging resistance, compression set (CS), dynamic-to-static modulus ratio (Kd/Ks) and low-temperature characteristics in accordance with the following JIS standards. The results are presented in Tables 4 and 5.

[Low-Temperature Characteristics]

A cylindrical rubber sample having a diameter of 30 mm and a height of 30 mm was fabricated, and the Kd value was measured at 40 Hz in accordance with JIS K 6385 (this is treated as the initial Kd value). Next, after 10 days of exposure at −35° C., the Kd value was similarly measured rapidly under the above conditions (this is treated as the Kd value after low-temperature exposure). Using the ratio (Kd after low-temperature exposure)/(initial Kd) as the criterion for rating the low-temperature characteristics, the target values in the tables were (Kd after low-temperature exposure)/(initial Kd)≤5.

[Hardness (Hd)]

Carried out in accordance with JIS K 6253 (type A).

[Tensile Elongation (Eb)]

Carried out in accordance with JIS K 6251. The target value for Eb was set to at least 500%.

[Tensile Strength (Tb)]

Carried out in accordance with JIS K 6251. The target value for Tb was set to at least 20 MPa.

[Resistance to Heat Aging (Heat Aging Test)]

Carried out in accordance with JIS K 6257 under heat aging conditions of 100° C. and 96 hours. The respective test specimens were left to stand under these conditions, following which the above hardness (Hd), tensile elongation (Eb) and tensile strength (Tb) were each measured. The change in hardness (Hd) was expressed in durometer degrees, and the changes in tensile elongation (Eb) and tensile strength (Tb) were expressed as the percent retention (%). The target values were a change in Hd of within ±4, a change in Eb of at least 80%, and a change in Tb of at least 80%.

[Compression Set]

A compression set test was carried out under heating and temperature conditions of 100° C. and 72 hours, in accordance with JIS K 6262. The target value for compression set was 25% or less.

[Static Spring Constant (Ks) and Dynamic-to-Static Modulus Ratio (Kd/Ks)]

The Kd value was measured in accordance with JIS K 6385 at 100 Hz. The target value for the dynamic-to-static modulus ratio was 1.5 or less.

Details on the compounding described above are given below.

Rubber Component
  Natural rubber (NR): "RSS#4"
  Butadiene rubber (BR): "T700" from JSR Corporation
Carbon Black
  FEF carbon black was used: "Asahi #65" from Asahi Carbon Co., Ltd.
Stearic Acid
  "Stearic Acid 50S" from New Japan Chemical Co., Ltd.
Zinc White
  Available as "No. 3 Zinc White" (Hakusui Tech Co., Ltd.)
Wax
  Available under the trade name "Suntight S" (Seiko Chemical Co., Ltd.)

Antioxidant: RD
  2,2,4-Trimethyl-1,2-dihydroquinoline polymer, available as "Nocrac 224" from Ouchi Shinko Chemical Industry Co., Ltd.
Antioxidant: 6C
  N-Phenyl-N'-(1,3-dimethylbutyl)-p-phenylenediamine, available as "Nocrac NS-6" from Ouchi Shinko Chemical Industry Co., Ltd.
Antioxidant: MB
  2-Mercaptobenzoimidazole, available as "Nocrac MB" from Ouchi Shinko Chemical Industry Co., Ltd.
Oil
  Naphthenic oil, available under the trade name "Sunthene 4240" from Sun Refining and Marketing Company.
Sulfur
  Available as "Sulfur Powder" from Tsurumi Chemical
N,N'-m-Phenylenedimaleimide
  Available under the trade name "Vulnoc PM" from Ouchi Shinko Chemical Industry Co., Ltd.
Vulcanization Accelerator: TS
  Tetramethylthiuram monosulfide, available under the trade name "Nocceler TS" from Ouchi Shinko Chemical Industry.
Vulcanization Accelerator: TT
  Tetramethylthiuram disulfide, available under the trade name "Nocceler TT-P" from Ouchi Shinko Chemical Industry Co., Ltd.
Vulcanization Accelerator: CZ
  N-Cyclohexyl-2-benzothiazolyl sulfenamide, available under the trade name "Nocceler CZ-G" from Ouchi Shinko Chemical Industry Co., Ltd.
Vulcanization Accelerator: TRA
  Dipentamethylenethiuram tetrasulfide, available under the trade name "Nocceler TRA" from Ouchi Shinko Chemical Industry Co., Ltd.
Vulcanization Accelerator: TBT
  Tetrabutylthiuram disulfide, available under the trade name "Nocceler TBT" from Ouchi Shinko Chemical Industry Co., Ltd.
Vulcanization Accelerator: TET
  Tetraethylthiuram disulfide, available under the trade name "Nocceler TET-G" from Ouchi Shinko Chemical Industry Co., Ltd.
Vulcanization Accelerator: TOT
  Tetrakis(2-ethylhexyl)thiuram disulfide, available under the trade name "Nocceler TOT-N" from Ouchi Shinko Chemical Industry Co., Ltd.
N-Phenyl-N-(trichloromethylthio)benzenesulfonamide
  Available under the trade name "Vulkalent E/C" from Lanxess AG

TABLE 4

| | | Working Example | | | | | | | | |
|---|---|---|---|---|---|---|---|---|---|---|
| (parts by weight) | | 15 | 16 | 17 | 18 | 19 | 20 | 21 | 22 | 23 |
| Rubber compounding ingredients | NR | 100.0 | 100.0 | 100.0 | 80.0 | 100.0 | 100.0 | 100.0 | 100.0 | 100.0 |
| | BR | | | | 20.0 | | | | | |
| | FEF CB | 30.0 | 30.0 | 30.0 | 30.0 | 30.0 | 30.0 | 30.0 | 30.0 | 30.0 |
| | Stearic acid | 2.0 | 2.0 | 2.0 | 2.0 | 2.0 | 2.0 | 2.0 | 2.0 | 2.0 |
| | Zinc white | 3.0 | 3.0 | 3.0 | 3.0 | 3.0 | 3.0 | 3.0 | 3.0 | 3.0 |
| | Wax | 2.0 | 2.0 | 2.0 | 2.0 | 2.0 | 2.0 | 2.0 | 2.0 | 2.0 |
| | Antioxidant: RD | 1.0 | 1.0 | 1.0 | 1.0 | 1.0 | 1.0 | 1.0 | 1.0 | 1.0 |
| | Antioxidant: 6C | 3.0 | 3.0 | 3.0 | 3.0 | 3.0 | 3.0 | 3.0 | 3.0 | 3.0 |
| | Antioxidant: MB | 1.0 | 1.0 | 1.0 | 1.0 | 1.0 | 1.0 | 1.0 | 1.0 | 1.0 |
| | Oil | 4.0 | 4.0 | 4.0 | 4.0 | 4.0 | 4.0 | 4.0 | 4.0 | 4.0 |
| | Sulfur | 0.4 | 0.6 | 0.6 | 0.6 | 0.6 | 1.0 | 0.6 | 0.6 | 0.6 |

TABLE 4-continued

|  | (parts by weight) | Working Example | | | | | | | | |
|---|---|---|---|---|---|---|---|---|---|---|
|  |  | 15 | 16 | 17 | 18 | 19 | 20 | 21 | 22 | 23 |
|  | N,N-m-Phenylenedimaleimide | 3.0 | 3.0 | 3.0 | 3.0 | 3.0 | 3.0 | 3.0 | 3.0 | 3.0 |
|  | Vulcanization accelerator: TS |  | 1.0 |  |  | 1.2 |  |  | 1.3 |  |
|  | Vulcanization accelerator: TT | 1.0 | 0.3 | 1.0 | 1.0 |  |  |  |  |  |
|  | Vulcanization accelerator: CZ | 2.0 | 2.0 | 2.0 | 2.0 | 2.0 | 2.0 | 2.0 | 2.0 | 2.0 |
|  | Vulcanization accelerator: TRA |  |  |  |  |  |  |  |  |  |
|  | Vulcanization accelerator: TBT |  |  |  |  | 0.5 | 2.0 | 2.0 |  |  |
|  | Vulcanization accelerator: TET |  |  |  |  |  |  |  | 0.5 | 1.5 |
|  | Vulcanization accelerator: TOT |  |  |  |  |  |  |  |  |  |
|  | N-Phenyl-N-(trichloromethyl-thio)-benzenesulfonamide | 1.0 | 1.0 | 1.0 | 1.0 | 1.0 | 1.0 | 1.0 | 1.0 | 1.0 |
| Rubber properties | Low-temperature properties | 4.9 | 4.0 | 3.1 | 3.7 | 5.0 | 2.2 | 2.5 | 2.9 | 2.5 |
|  | Hardness Hd ① | 53 | 57 | 57 | 58 | 57 | 58 | 57 | 57 | 59 |
|  | Tensile elongation Eb (%) ② | 520 | 540 | 560 | 560 | 600 | 520 | 550 | 560 | 520 |
|  | Tensile strength Tb (%) ③ | 26.1 | 20.4 | 23.6 | 21.6 | 23.8 | 24.2 | 25.2 | 23.2 | 23.0 |
|  | Hd after aging ④ | 55 | 59 | 60 | 60 | 59 | 59 | 60 | 60 | 62 |
|  | Eb after aging (%) ⑤ | 500 | 530 | 500 | 480 | 520 | 470 | 470 | 480 | 450 |
|  | Tb after aging (%) ⑥ | 24.5 | 21.8 | 20.6 | 17.2 | 20.7 | 22.6 | 23.2 | 21.0 | 19.2 |
|  | ΔHd (④ − ①) | 2 | 2 | 3 | 2 | 2 | 1 | 3 | 3 | 3 |
|  | Δ Eb retention (⑤/②, %) | 96 | 98 | 89 | 86 | 87 | 90 | 85 | 86 | 87 |
|  | Δ Tb retention (⑥/③, %) | 94 | 107 | 87 | 80 | 87 | 93 | 92 | 91 | 83 |
|  | Compression set (%) | 18 | 23 | 18 | 23 | 22 | 19 | 20 | 23 | 23 |
|  | Static spring constant: Ks (N/mm) | 106.4 | 120.0 | 123.8 | 130.5 | 118.7 | 127.0 | 125.7 | 128.5 | 130.0 |
|  | Dynamic-to-static modulus ratio: Kd at 100 Hz/Ks | 1.28 | 1.49 | 1.49 | 1.38 | 1.49 | 1.28 | 1.47 | 1.50 | 1.50 |

TABLE 5

|  | (parts by weight) | Working Example | | | Comparative Example | | | |
|---|---|---|---|---|---|---|---|---|
|  |  | 24 | 25 | 26 | 11 | 12 | 13 | 14 |
| Rubber compounding ingredients | NR | 100.0 | 100.0 | 100.0 | 100.0 | 100.0 | 100.0 | 60.0 |
|  | BR |  |  |  |  |  |  | 40.0 |
|  | FEF CB | 30.0 | 30.0 | 30.0 | 30.0 | 30.0 | 30.0 | 30.0 |
|  | Stearic acid | 2.0 | 2.0 | 2.0 | 2.0 | 2.0 | 2.0 | 2.0 |
|  | Zinc white | 3.0 | 3.0 | 3.0 | 3.0 | 3.0 | 3.0 | 3.0 |
|  | Wax | 2.0 | 2.0 | 2.0 | 2.0 | 2.0 | 2.0 | 2.0 |
|  | Antioxidant: RD | 1.0 | 1.0 | 1.0 | 1.0 | 1.0 | 1.0 | 1.0 |
|  | Antioxidant: 6C | 3.0 | 3.0 | 3.0 | 3.0 | 3.0 | 3.0 | 3.0 |
|  | Antioxidant: MB | 1.0 | 1.0 | 1.0 | 1.0 | 1.0 | 1.0 | 1.0 |
|  | Oil | 4.0 | 4.0 | 4.0 | 4.0 | 4.0 | 4.0 | 4.0 |
|  | Sulfur | 0.6 | 0.6 | 0.6 | 0.4 | 1.2 | 0.4 | 0.4 |
|  | N,N-m-Phenylenedimaleimide | 3.0 | 3.0 | 3.0 | 3.0 | 3.0 | 3.0 | 3.0 |
|  | Vulcanization accelerator: TS | 1.0 |  | 1.0 | 1.5 | 1.5 |  | 1.5 |
|  | Vulcanization accelerator: TT |  |  |  |  |  | 1.0 |  |
|  | Vulcanization accelerator: CZ | 2.0 | 2.0 | 2.0 | 2.0 | 2.0 | 2.0 | 2.0 |
|  | Vulcanization accelerator: TRA |  |  | 0.5 |  |  |  |  |
|  | Vulcanization accelerator: TBT |  |  |  |  |  |  |  |
|  | Vulcanization accelerator: TET |  |  |  |  |  |  |  |
|  | Vulcanization accelerator: TOT | 1.0 | 4.0 |  |  |  |  |  |
|  | N-Phenyl-N-(trichloromethyl-thio)benzenesulfonamide | 1.0 | 1.0 | 1.0 |  |  |  |  |
| Rubber properties | Low-temperature properties | 3.7 | 2.6 | 2.9 | 40.0 | 32.0 | 16.0 | 9.2 |
|  | Hardness Hd ① | 56 | 57 | 58 | 52 | 55 | 56 | 53 |
|  | Tensile elongation Eb (%) ② | 590 | 540 | 540 | 590 | 510 | 550 | 490 |
|  | Tensile strength Tb (%) ③ | 23.0 | 23.5 | 23.1 | 24.6 | 23.8 | 27.2 | 16.2 |
|  | Hd after aging ④ | 59 | 60 | 61 | 54 | 57 | 57 | 56 |
|  | Eb after aging (%) ⑤ | 510 | 440 | 480 | 530 | 400 | 480 | 440 |
|  | Tb after aging (%) ⑥ | 20.6 | 19.6 | 20.7 | 22.8 | 19.8 | 23.4 | 13.5 |
|  | ΔHd (④ − ①) | 3 | 3 | 3 | 2 | 2 | 1 | 3 |
|  | Δ Tb retention (⑤/②, %) | 86 | 81 | 89 | 90 | 78 | 87 | 90 |
|  | Δ Tb retention (⑥/③, %) | 90 | 83 | 90 | 93 | 83 | 86 | 83 |
|  | Compression set (%) | 23 | 17 | 23 | 22 | 26 | 21 | 19 |
|  | Static spring constant: Ks (N/mm) | 120.0 | 129.2 | 130.1 | 110.5 | 110.0 | 111.3 | 113.0 |
|  | Dynamic-to-static modulus ratio: Kd at 100 Hz/Ks | 1.49 | 1.44 | 1.50 | 1.53 | 1.42 | 1.48 | 1.21 |

As is apparent from the rubber properties in Tables 4 and 5 above, the low-temperature characteristics, hardness, tensile properties such as elongation and strength, heat aging resistance, compression set and dynamic-to-static modulus ratio for the rubber compositions in Working Examples 15 to 26 according to the invention all cleared their target values, demonstrating that each of these compositions had good properties.

By contrast, Comparative Example 11 was an example in which N-phenyl-N-(trichloromethylthio)benzenesulfonamide was not used as a vulcanizing agent. As a result, the low-temperature characteristics were poor and the dynamic-to-static modulus ratio was poor.

Comparative Example 12 was an example in which N-phenyl-N-(trichloromethylthio)benzenesulfonamide was not used as a vulcanizing agent. As a result, the low-temperature characteristics and the heat aging resistance were poor. The compression set properties were also poor.

Comparative Example 13 was an example in which N-phenyl-N-(trichloromethylthio)benzenesulfonamide was not used as a vulcanizing agent. As a result, the low-temperature characteristics were poor.

Comparative Example 14 was an example in which N-phenyl-N-(trichloromethylthio)benzenesulfonamide was not used as a vulcanizing agent. As a result, the low-temperature characteristics were poor. Tensile properties such as elongation and strength were also poor (the rubber compounding here differed from that in Comparative Example 12 in that BR was substituted for some of the NR).

The invention claimed is:

1. An anti-vibration rubber composition used for an automobile comprising:
    a rubber component in which the primary component is selected from the group consisting of natural rubber (NR), isoprene rubber (IR), butadiene rubber (BR), acrylonitrile-butadiene rubber (NBR) and combinations thereof,
    a bismaleimide compound as a vulcanizing agent,
    an N-phenyl-N-(trichloromethylthio)benzenesulfonamide, and
    a carbon black,
    wherein the rubber component includes a sulfur, and
    the rubber component does not include styrene-butadiene rubber (SBR).

2. The anti-vibration rubber composition of claim 1, wherein the sulfur is included in an amount of from 0.2 to 1.0 part by weight per 100 parts by weight of the rubber component.

3. The anti-vibration rubber composition of claim 1, wherein the rubber component includes a thiuram-type vulcanizing accelerator having chemical structure (1) or (2) below

[Chemical Formula 1]

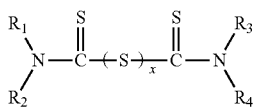 (1)

wherein x is a positive number of 2 or more, and $R_1$, $R_2$, $R_3$ and $R_4$ are mutually like or unlike acyclic alkyl groups;

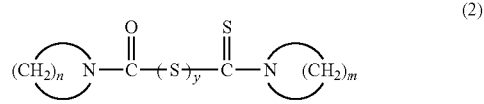 (2)

wherein y is a positive number of 2 or more, and m and n are each positive numbers of 2 or more.

4. The anti-vibration rubber composition of claim 3, wherein the thiuram-type vulcanization accelerator is included in an amount of from 0.5 to 5.0 parts by weight per 100 parts by weight of the rubber component.

5. An anti-vibration rubber obtained by curing the rubber composition of claim 1.

6. The anti-vibration rubber composition of claim 1, wherein the carbon black is selected from the group consisting of SRF, GPF, FEF, HAF, ISAF, SAF, FT and MT.

7. The anti-vibration rubber composition of claim 1, wherein the content of the carbon black is from 15 to 100 parts by weight per 100 parts by weight of the rubber component.

8. The anti-vibration rubber composition of claim 1, wherein the bismaleimide compound is at least one selected from the group consisting of N,N'-m-phenylenebismaleimide and 4,4'-methanebis(N-phenylmaleimide).

9. The anti-vibration rubber composition of claim 1, wherein the content of N-phenyl-N-(trichloromethylthio) benzenesulfonamide is from 0.2 to 4 parts by weight per 100 parts by weight of the rubber component.

10. The anti-vibration rubber composition of claim 1, wherein the amount of the bismaleimide compound is from 1.0 to 5.0 parts by weight per 100 parts by weight of the primary component of the rubber component.

11. The anti-vibration rubber according to claim 5, wherein a dynamic-to-static modulus ratio (Kd/Ks) based on JIS K 6385, is not more than 1.67.

12. A torsional damper for an automobile comprising the anti-vibration rubber of claim 1.

13. An engine mount for an automobile comprising the anti-vibration rubber of claim 1.

14. A muffler hanger for an automobile comprising the anti-vibration rubber of claim 1.

* * * * *